United States Patent [19]

Wagner

[11] Patent Number: 4,707,982
[45] Date of Patent: Nov. 24, 1987

[54] THERMAL REGENERATIVE INJECTOR

[75] Inventor: William R. Wagner, Los Angeles, Calif.

[73] Assignee: Rockwell International Corporation, El Segundo, Calif.

[21] Appl. No.: 277,520

[22] Filed: Jun. 26, 1981

[51] Int. Cl.⁴ ................................................ F02K 9/00
[52] U.S. Cl. ......................................... 60/258; 60/260
[58] Field of Search ................. 60/204, 258, 259, 260, 60/267; 62/52; 165/141; 239/132.1, 135, 137

[56] References Cited

U.S. PATENT DOCUMENTS

| | | | |
|---|---|---|---|
| 3,049,870 | 8/1962 | Chamberlain | 60/260 X |
| 3,085,394 | 4/1963 | Handley | 60/258 X |
| 3,561,217 | 2/1971 | Hall | 60/260 X |
| 4,096,616 | 6/1978 | Coffinberry | 165/141 X |

FOREIGN PATENT DOCUMENTS 740800  11/1955  United Kingdom ............... 239/135

Primary Examiner—Carlton R. Croyle
Assistant Examiner—Donald E. Stout
Attorney, Agent, or Firm—H. Fredrick Hamann; Harry B. Field; David C. Faulkner

[57] ABSTRACT

A thermal regenerative injector 10 for a rocket engine that transfers heat from a fuel after turbine operation to the fuel prior to turbine operation, thereby providing a higher chamber pressure and lower fuel pump pressure. The injector 10 has a plurality of elements 44 having concentric channels 78, 80, and 82 separated by sleeves 66, 68, and 70, the fuels flowing therethrough, heat being transferred through a common middle sleeve 68, The cold fuel, after being so heated, is heated further in the typical fashion of routing it through the combustion zone and nozzle cooling jackets 16 and 20.

14 Claims, 7 Drawing Figures

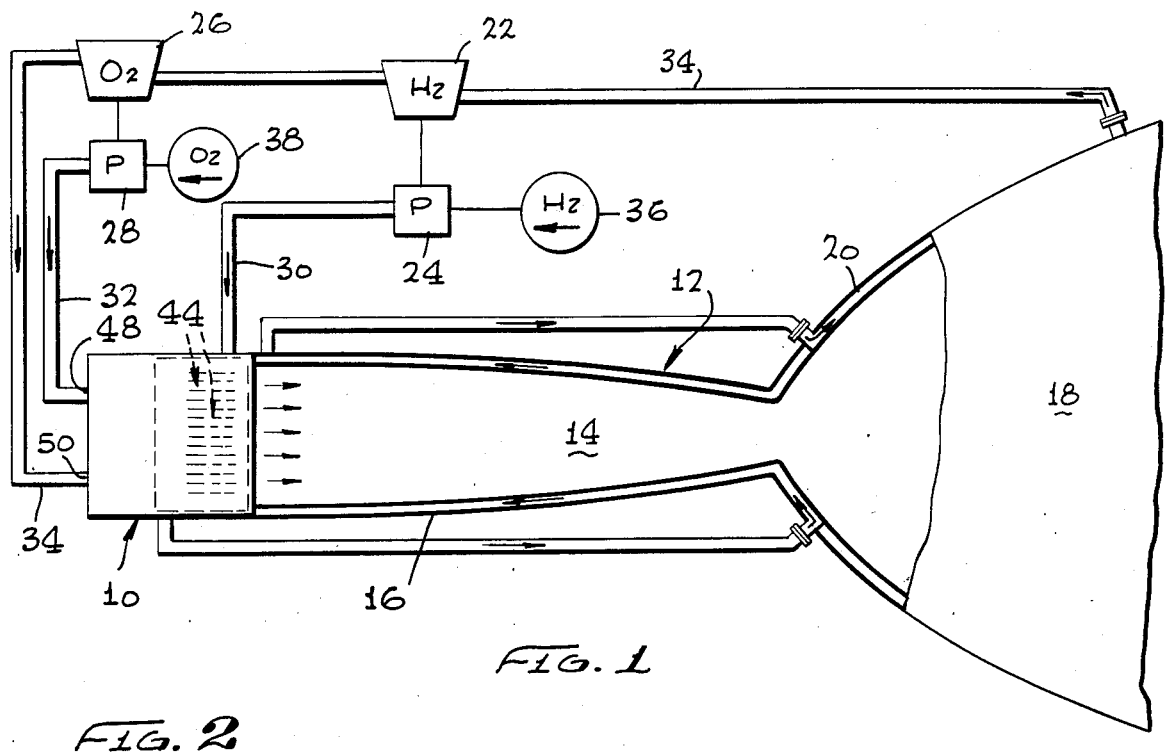
FIG. 1
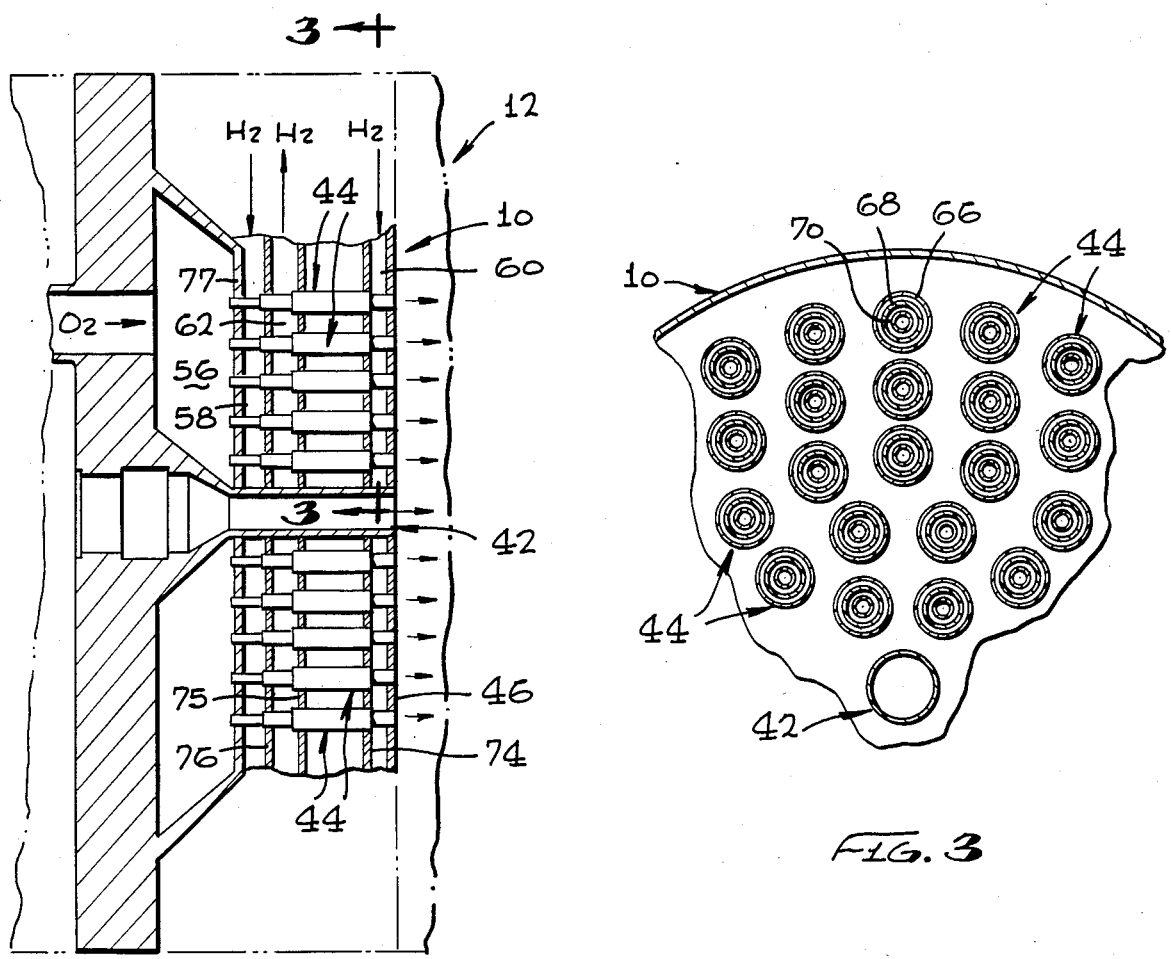
FIG. 2
FIG. 3

THERMAL REGENERATIVE INJECTOR

BACKGROUND OF THE INVENTION

1. Field of the Invention

The present invention relates to high performance fuel injectors of rocket engines. More specifically, it relates to a tricentric thermal regenerative injector that internally heats the fuel prior to the fuel flowing to the turbine.

2. Description of the Prior Art

Fuel for a rocket engine is conventionally heated prior to passing through the turbine, giving an increased thrust chamber pressure and a decreased fuel pump pressure. Typically, the fuel is routed through the jackets of the combustion zone and nozzle, cooling the metal surrounding the combustion while transferring heat to the fuel.

However, when the heated fuel has exited the turbine, it is routed to the injector and ignited in the thrust chamber, still at a higher temperature. The heat energy in the ignited fuel is therefore expanded without benefit. What is needed is an improved method of utilizing the heat in the fuel subsequent to turbine operation in order to improve the efficiency of the engine.

SUMMARY OF THE INVENTION

The injector of the present invention takes the flow discharge heat of the turbine drive fuel and reduces its temperature at the injector by transferring the heat to the lower temperature fuel at the pump outlet temperature. This preheated fuel is subsequently heated further in the cooling jackets of the combustion zone and nozzle to derive higher fuel temperatures for producing turbine power.

The thermal regenerative injector comprises a plurality of injector elements, an igniter, a faceplate and a housing. Each injector element and the igniter are secured within the housing and project into a plurality of openings in the faceplate. The injector element supplies fuel and oxidizer in a mixing mode into a combustion zone of a thrust chamber, after which the igniter insures ignition.

Each injector element comprises three concentric sleeves creating three channels. The innermost channel and middle channel supplies the oxidizer and hot fuel, respectively, to the thrust chamber. The outer channel contains fuel, in a relative cooler state, prior to its use to drive the turbine. The middle chamber containing the hot fuel and the outer chamber containing the cooler fuel are separated by a material that allows heat to transfer efficiently. Therefore, heat in the fuel flow subsequent to turbine operation is transferred to the fuel flow prior to turbine operation.

OBJECTS OF THE INVENTION

Therefore, an object of the injector of the present invention is to provide a higher chamber pressure in rocket engines than was previously obtainable.

Another object of the injector of the present invention is to provide a lower fuel pump pressure.

Yet another object of the injector of the present invention is to provide additional heat to the fuel supplied to the turbine.

Still another object of the injector of the present invention is to reduce the temperature of the faceplate abutting the combustion chamber.

Another object of the injector of the present invention is to utilize the heat energy contained in the fuel subsequent to turbine operation.

Other objects, advantages and novel features of the present invention will become apparent from the following detailed description of the invention when considered in conjunction with the accompanying drawing.

BRIEF DESCRIPTION OF THE DRAWINGS

FIG. 1 is a diagram of a rocket engine including the injector of the present invention.

FIG. 2 is a partial cross section of the injector.

FIG. 3 is a partial view taken along Line 3—3 of FIG. 2.

FIG. 4 is a cross section of three elements of the injector.

DETAILED DESCRIPTION OF THE PREFERRED EMBODIMENTS

Figure 9:
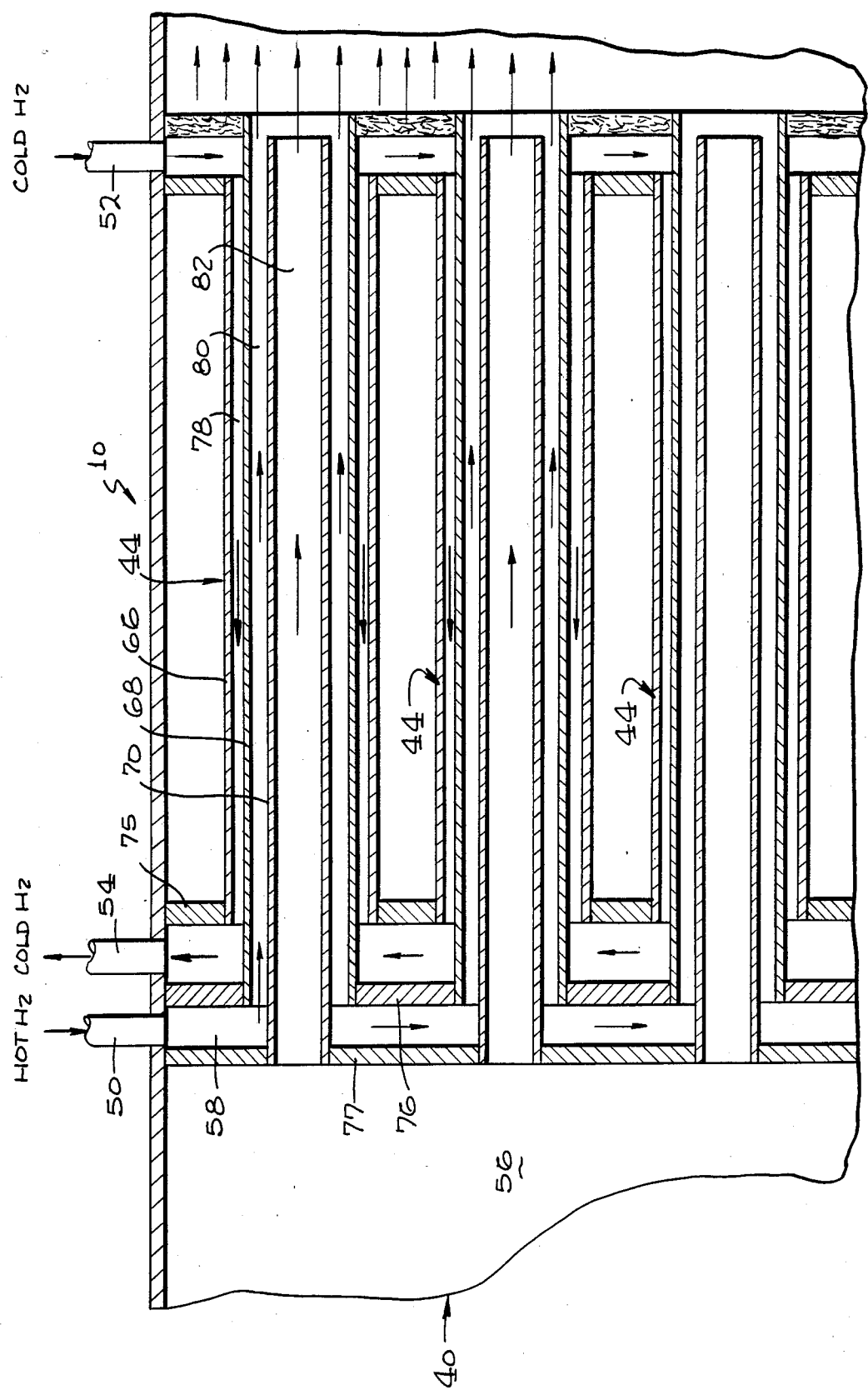

The rocket engine of FIG. 1 comprises the injector 10 of the pressent invention and a thrust chamber, generally designated 12, that includes a combustion zone 14, combustion zone cooling jacket 16, nozzle 18, and nozzle cooling jacket 20. Additionally, a fuel turbine 22, fuel pump 24, fuel turbine 26, and oxidizer pump 28 communicate with the injector 10 and thrust chamber 12 through fuel pump line 30, oxidizer pump line 32, and hot fuel line 34. Although $H_2$ and $O_2$ are typically identified as the fuel and oxidizer for rocket engines, any fuel or oxidizer may be used with the injector 10 of the present invention. Examples of other combinations are $NH_3$ and $O_2$, $C_3H_8$ and $O_2$, $CH_4$ and $O_2$, and $H_2$ and $F_2$. Additionally, depending on the fuel and oxidizer used, the words fuel and oxidizer may be interchanged in the description and drawings.

The thrust chamber 12 defines the generally cylindrical combustion zone 14 which receives fuel and oxidizer under pressure from the injector 10, wherein the fuel and oxidizer are mixed and ignited. The ignited fuel then departs the thrust chamber 12 via the nozzle 18. Circumscribing the combustion zone 14 and nozzle 18 are the combustion zone cooling jacket 16 and the nozzle cooling jacket 20.

The combustion zone cooling jacket 16, nozzle cooling jacket 20, and hot fuel line 34 communicate in succession, allowing fuel to pass therethrough. Heat generated in the combustion zone 14 and nozzle 18 is transferred to the fuel through the cooling jackets 16 and 20. Typically, as shown, the flow direction of the fuel through the combustion zone cooling jacket 16 is opposite the flow direction of the ignited gases through the combustion zone 14. However, the flow through the cooling jackets 16 and 20 are not meant to be limited to this sequence or flow direction.

The hot fuel in hot fuel line 34 drives fuel turbine 22 and fuel turbine 26 before re-entering the injector 10 at hot fuel inlet 50. The fuel turbine 22 and oxidizers turbine 26 drive the fuel pump 24 and oxidizer pump 28, respectively, which supplies the fuel and oxidizer under pressure from the fuel source 36 and the oxidizer source 38. Oxidizer and cold fuel flow along the oxidizer pump line 32 and the pump line 30, respectively, to the injector. The turbines 22 and 26 are driven by the hot fuel in succession; however, other turbine arrangements are possible. For instance, the turbines 22 and 26 may be in parallel where the hot fuel is divided along two routes, one route each going to a turbine. A further example might have one turbine driven by hot fuel flowing from the combustion zone cooling jacket 16 while the other turbine is driven by hot fuel flowing from the nozzle cooling jacket 20. Any number of arrangements are possible and the invention herein is not to be limited to any of such arrangements.

Referring now to FIGS. 2–4, the injector 10 comprises a housing 40, and igniter 42, a plurality of coaxial injector elements 44, and a Rigimesh porous metal faceplate 46. The housing 40 includes an oxidizer inlet 48, a hot fuel inlet 50, a cold fuel inlet 52, a cold fuel outlet 54, an oxidizer cavity 56, a hot fuel cavity 58, a cold fuel inlet cavity 60, and a cold fuel outlet cavity 62. The oxidizer inlet 48 is adjacent to and communicates with the oxidizer cavity 56 and is receivably connected to the oxidizer pump line 32. Similarly, the hot fuel inlet 50 is adjacent to and communicates with the hot fuel cavity 58 and is receivably connected to the hot fuel line 34.

Figure 5:
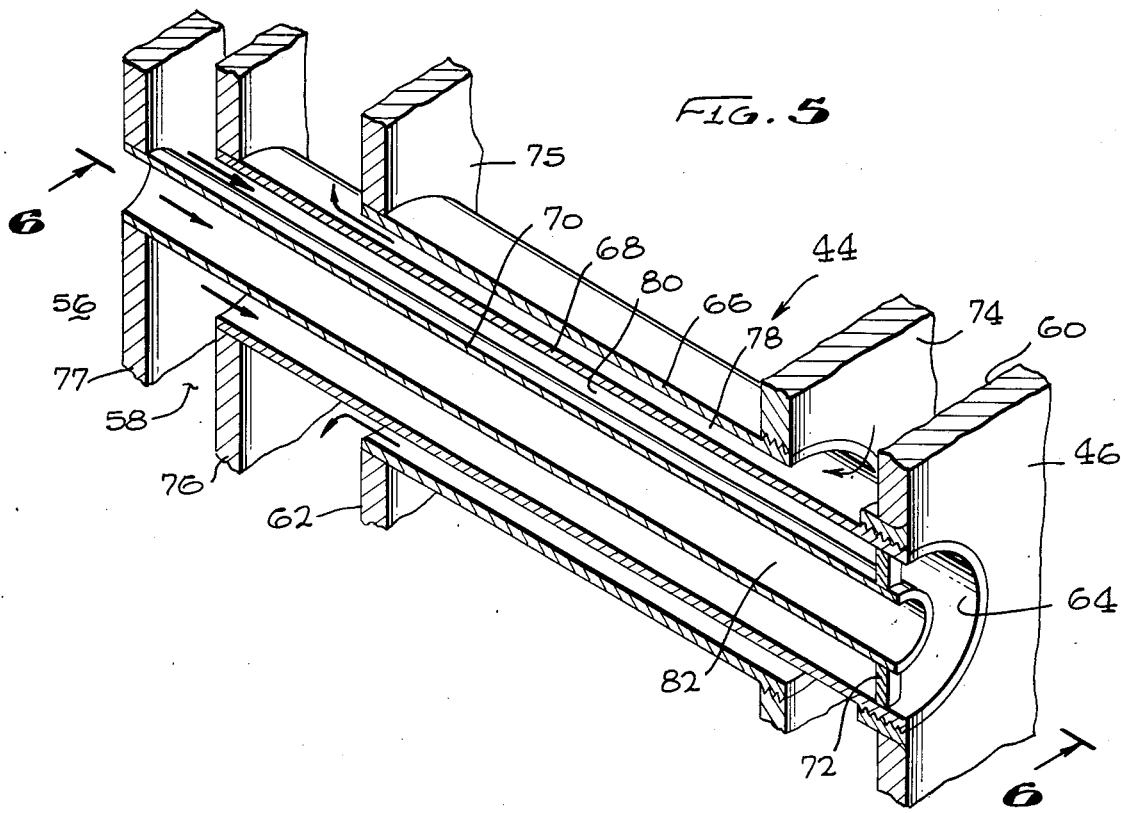
FIG. 5 is a perspective of an element of the injector.
Figure 6:
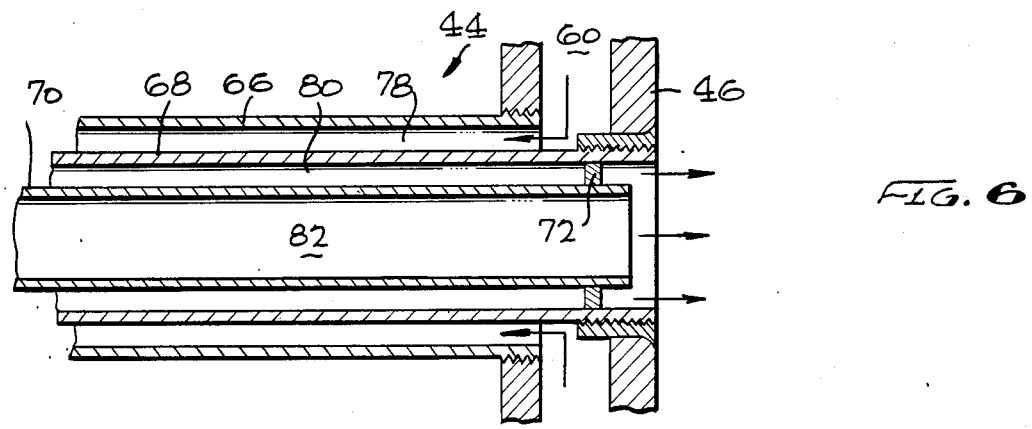
FIG. 6 is a cross section taken along Line 6—6 of FIG. 5.

Referring not to FIGS. 4 and 5, the coaxial injector element 44 is detachably mounted in hole 64 of a faceplate 46. The coaxial injector element 44 is comprised of outer sleeve 66, middle sleeve 68 and inner sleeve 70. The three sleeves 66, 68 and 70 are concentric, open-ended, hollow cylinders whose relative positions are maintained by ribs 72. The three sleeves 66, 68 and 70 create outer channel 78, middle channel 80, and inner channel 82 for the flow of cold fuel, hot fuel and oxidizer, respectively. Outer channel 78 and middle channel 80 are annular whereas inner channel 82 is cylindrical. The back plate 74 is parallel, but spaced, from faceplate 46, creating the cold fuel inlet cavity 60. One end of outer sleeve 66 terminates at first partition 75, of middle sleeve 68 at second partition 76, and of inner sleeve 70 at third partition 77. The outer channel 78 receives cold fuel from the cold fuel inlet cavity 60, the middle channel 80 receives hot fuel from the hot fuel cavity 58, and the inner channel 82 receives oxidizer from the oxidizer cavity 56.

The middle sleeve 68 is best constructed of a material which allows a high transference of heat, such as nickel or a copper alloy. The remaining elements of the injector, including the housing 40, may be manufactured of any material capable of withstanding the temperatures and pressures involved. Stainless steel would be an adequate candidate.

Enhancement of the heat exchange can be provided by spirals, fins dimples, or a general roughness on the middle sleeve 68 and protruding into the outer channel 78. This enhancement is accomplished in part by ribs 72 used to space the sleeves.

In summary, the operation begins by pumping liquid fuel and liquid oxidizer from fuel source 36 and oxidizer source 38 by fuel pump 24 and oxidizer pump 28, respectively, to injector 10. The fuel enters the cold fuel inlet cavity 60 by way of cold fuel inlet 52 and proceeds through the outer channel 78 to the cold fuel outlet cavity 62. The fuel exits the injector 10 through the cold fuel outlet 54, proceeding to the combustion zone cooling jacket 16 and nozzle cooling jacket 20 where the fuel is heated once combustion commences. The hot fuel gas flows through hot fuel line 34 to the turbines 22 and 26 which provide the power through mechanical linkage to pumps 36 and 38. The hot fuel then flows back to the injector 10 and enters the hot fuel cavity 58 through hot fuel inlet 50. The fuel then proceeds through the middle channel 80 to the combustion zone 14.

The liquid oxidizer enters the injector 10 through oxidizer inlet 48 into oxidizer cavity 56, proceeding through the inner channel 82 to the combustion zone 14, where the oxidizer and fuel mix and are ignited by igniter 42. As the hot fuel flows through middle channel, heat is transferred through middle sleeve 68 to the cold fuel flowing countercurrent through the outer channel 78. This heat transfer provides for a higher fuel temperature flowing to the turbines 22 and 26 and makes use of the potentially wasted heat energy of the fuel prior to ignition. A small portion of the cold fuel in the cold fuel inlet cavity 60 is drawn through the Rigimesh porous metal faceplate 46 in order to cool the faceplate. This small portion of fuel combines with the hot fuel for combustion. Alternatively, the faceplate 46 may be a non-porous metal which is cooled by the cold fuel flowing in cold fuel inlet cavity 60. This further heats the cold fuel.

The regenerator approach can nearly double the total heat exchange over the conventional non-regenerative case for greater power or power margin on the turbine/pump loops. The total heat exchange surface area in the concept is $As = \pi DLn$, where:

D is the diameter of the sleeve.

L is the length of the sleeve.

n is the number of injector elements 44.

The pressure drop of the cold fuel is additive to the power cycle pressure but is low because of the large surface area provided by the large number of injector elements 44 and high fuel density. No additional parasitic pressure loss occurs for the hot fuel within the middle channel 80.

Figure 7:
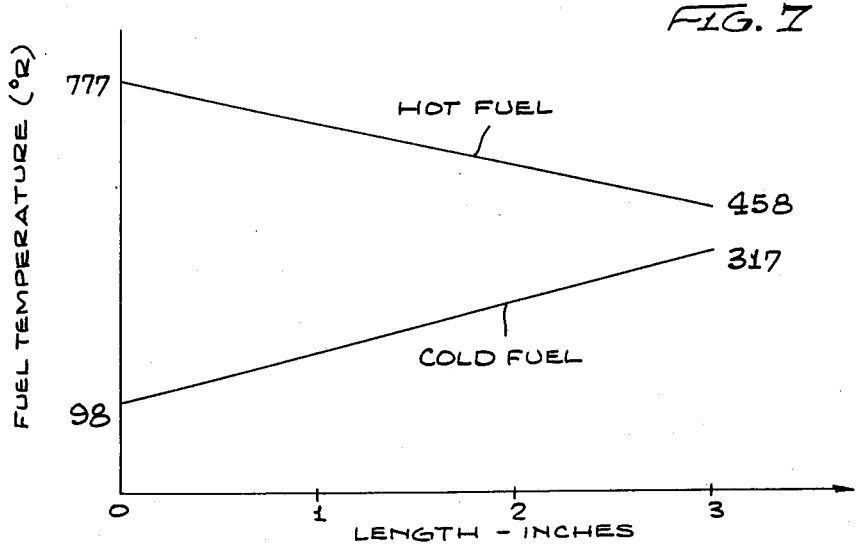
FIG. 7 is a graph showing heat transference per unit length.

Injectors of typical length would allow an outer channel 78 length of 3 to 7 inches. Engines with staged combustion cycles having a thermal regenerative injector would exhibit increased thrust chamber pressures to 5000 psia in place of the typical 1000 psia. The graph of FIG. 7 illustrates computed heat exchange rates for a 3 inch injector 44 having surface fins in the outer channel 78. The heat exchanged was 4562 Btu/sec., which is a sizeable power rate exchanged within the injector.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An apparatus for injecting fuel and oxidizer into the combustion zone of an engine, comprising:

a housing;

means for receiving said fuel within said housing;

means for preheating said fuel within said housing;

a heat source external to said apparatus;

means for transporting said fuel from said housing to said heat source wherein said fuel is heated;

means for receiving said heated fuel within said housing;

means for receiving said oxidizer within said housing; and means for injecting said oxidizer and said heated fuel from said housing into said combustion zone, said injection means being integral with said housing.

2. The apparatus of claim 1 further comprising:

an oxidizer pump for supplying said oxidizer to said housing;

a fuel pump for supplying said fuel to said housing; and means for driving said pumps wherein said driving means is powered by said heated fuel.

3. The apparatus of claim 1 wherein said housing includes:

a faceplate of a porous material juxtaposed to said combustion zone, having openings through which said heated fuel and said oxidizer are injected into said combustion zone, a portion of said fuel passing through said porous material prior to being preheated in order to cool said faceplate.

4. The apparatus of claim 1 wherein said injecting means comprises:

an inner sleeve connected to said housing for receiving and directing said oxidizer into said combustion zone;

a middle sleeve connected to said housing for receiving and directing said heated fuel into said combustion zone; and an outer sleeve connected to said housing for receiving said fuel in an unheated condition, said inner, middle, and outer sleeves being concentric, said inner sleeve defining a substantially cylindrical channel for said oxidizer, said middle sleeve defining an annular middle channel surrounding said inner channel for said heated fuel, said outer sleeve and said middle sleeve defining an outer channel for said preheated fuel, wherein the heat is transmitted through said middle sleeve from the heated fuel to the unheated fuel.

5. An apparatus for injecting fuel and oxidizer into the combustion zone of an engine, comprising:

a housing;

means for receiving said fuel within said housing;

means for preheating said fuel within said housing;

a heat source external to said apparatus, said heat source comprising a combustion zone cooling jacket circumscribing said combustion zone, said fuel flowing therethrough and being heated by the ignited fuel and oxidizer in said combustion zone;

means for transporting said fuel from said housing to said heat source wherein said fuel is heated;

means for receiving said heated fuel within said housing;

means for receiving said oxidizer within said housing; and means for injecting said oxidizer and said heated fuel from said housing into said combustion zone, said injection means being integral with said housing.

6. An apparatus for injecting fuel and oxidizer into the combustion zone of an engine, comprising:

a housing;

means for receiving said fuel within said housing;

means for preheating said fuel within said housing;

a heat source external to said apparatus, said heat source comprising a nozzle connected to said combustion zone for receiving substantially all of the ignited fuel and oxidizer from said combustion zone, having a nozzle cooling jacket circumscribing said nozzle, said fuel flowing therethrough and being heated by the ignited fuel and oxidizer in said nozzle;

means for transporting said fuel from said housing to said heat source wherein said fuel is heated;

means for receiving said heated fuel within said housing;

means for receiving said oxidizer within said housing; and means for injecting said oxidizer and said heated fuel from said housing into said combustion zone, said injection means being integral with said housing.

7. An apparatus for injecting fuel and oxidizer into the combustion zone of an engine, comprising:

a housing;

means for receiving said fuel within said housing;

means for preheating said fuel within said housing;

a heat source external to said apparatus said heat source comprising a combustion zone cooling jacket circumscribing said combustion zone, said fuel flowing therethrough;

means for transporting said fuel from said housing to said heat source wherein said fuel is heated;

means for receiving said heated fuel within said housing;

means for receiving said oxidizer within said housing; and means for injecting said oxidizer and said heated fuel from said housing into said combustion zone, said injection means being integral with said housing.

8. An apparatus for injecting fuel and oxidizer into the combustion zone of an engine, comrpising:

a housing having three inlets and an outlet, said inlets and outlet for respectively receiving and discharging said fuel and said oxidizer;

a faceplate integrally connected to said housing defining a first plurality of orifices for injecting said oxidizer into said combustion zone and a second plurality of orifices for injecting said fuel into said combustion zone;

a backplate integrally connected to said housing, said backplate, said faceplate and said housing defining a cold fuel inlet cavity;

a first partition integrally connected to said housing;

a second partition integrally connected to said housing, said second partition, said housing, and said first partition defining a cold fuel outlet cavity;

a third partition integrally connected to said housing, said third partition, said housing, and said second partition defining a hot fuel cavity, said third partition and said housing defining an oxidizer cavity;

an outer sleeve integrally connected to said backplate and said first partition;

a middle sleeve integrally connected to said faceplate and said second partition, said middle sleeve and outer sleeve defining an outer channel communicating between said cold fuel cavity and said cold fuel outlet cavity;

a rib; and an inner sleeve integrally connected to said third partition and connected to said middle sleeve by said rib, said inner sleeve and said middle sleeve defining a middle channel communicating between said hot fuel cavity and said combustion zone, said inner sleeve defining an enclosed inner channel communicating between said oxidizer cavity and said combustion zone.

9. An apparatus for injecting fuel and oxidizer into the combustion zone of an engine, comprising:

a housing;

means for receiving said fuel within said housing;

a heat source external to said apparatus;

means for transporting said fuel from said housing to said heat source wherein said fuel is heated;

means for receiving said heated fuel within said housing;

means for receiving said oxidizer within said housing; and means for injecting said oxidizer and said heated fuel from said housing into said combustion zone, said injection means being integral with said housing; said injecting means comprising:

an inner sleeve connected to said housing for receiving and directing said oxidizer into said combustion zone, a middle sleeve connected to said housing for receiving and directing said heated fuel into said combustion zone, and an outer sleeve connected to said housing for receiving said fuel in an unheated condition, said inner, middle, and outer sleeves being concentric, said inner sleeve defining a substantially cylindrical channel for said oxidizer, said middle sleeve surrounding said inner sleeve for said heated fuel, said outer sleeve and said middle sleeve defining an outer channel for said preheated fuel, wherein the heat is transmitted through said middle sleeve from the heated fuel to the preheated fuel, the relative positions of said fuel and said oxidizer being interchangeable.

10. An injector for a rocket engine, comprising:

a plurality of paralleled injector elements, each of which includes at least three concentric, spaced tubes, one carrying cold rocket fuel, a second carrying hot rocket fuel, and a third carrying oxidizer, the tubes carrying the fuel being adjacent to each other and the wall of the tube separating the hot from the cold fuel being formed of a good heat-conducting material.

11. An injector as in claim 10, wherein all tubes carrying cold fuel are fed from a common inlet and feed into a common outlet.

12. An injector as in claim 10, wherein all tubes carrying hot fuel are fed from a common inlet and feed into the combustion chamber of the rocket engine.

13. An injector as in claim 10, wherein all tubes carrying oxidizer are fed from a common inlet and feed into the combustion chamber of the rocket engine.

14. An apparatus for injecting fuel and oxidizer into the combustion zone of an engine, comprising:

a housing having three inlets and an outlet, said inlets and outlet for respectively receiving and discharging said fuel and said oxidizer;

a faceplate integrally connected to said housing defining a first plurality of orifices for injecting said oxidizer into said combustion zone and a second plurality of orifices for injecting said fuel into said combustion zone;

a backplate integrally connected to said housing, said backplate, said faceplate and said housing defining a cold fuel inlet cavity;

a first partition integrally connected to said housing;

a second partition integrally connected to said housing, said second partition, said housing, and said first partition defining a cold fuel outlet cavity;

a third partition integrally connected to said housing, said third partition, said housing, and said second partition defining a hot fuel cavity, said third partition and said housing defining an oxidizer cavity;

an outer sleeve integrally connected to said backplate and said first partition;

a middle sleeve integrally connected to said faceplate and said second partition, said middle sleeve and outer sleeve defining an outer channel communicating between said cold fuel cavity and said cold fuel outlet cavity;

a rib; and an inner sleeve integrally connected to said third partition and connected to said middle sleeve by said rib, said inner sleeve and said middle sleeve defining a middle channel communicating between said hot fuel cavity and said combustion zone, said inner sleeve defining an enclosed inner channel communicating between said oxidizer cavity and said combustion zone, the relative positions of said fuel and said oxidizer being interchangeable.

* * * * *